United States Patent [19]

Fujiwara et al.

[11] Patent Number: 5,014,575
[45] Date of Patent: May 14, 1991

[54] CONTROL SYSTEMS FOR AUTOMATIC TRANSMISSIONS

[75] Inventors: Takuji Fujiwara, Minamitaisho; Koji Waseda; Akio Matsumoto, both of Hiroshima, all of Japan

[73] Assignee: Mazda Motor Corporation, Hiroshima, Japan

[21] Appl. No.: 224,126

[22] Filed: Jul. 25, 1988

[30] Foreign Application Priority Data

Jul. 30, 1987 [JP] Japan .................. 62-191380
Jul. 30, 1987 [JP] Japan .................. 62-191390

[51] Int. Cl.$^5$ .................................. B60K 41/18
[52] U.S. Cl. ..................................... 74/866
[58] Field of Search ............ 74/866, 867, 752 A, 74/732, 844

[56] References Cited

U.S. PATENT DOCUMENTS

| 3,165,008 | 1/1965 | Föster | 74/844 X |
|---|---|---|---|
| 3,956,947 | 5/1976 | Leising et al. | 74/866 |
| 4,041,809 | 8/1977 | Dick et al. | 74/866 |
| 4,283,970 | 8/1981 | Vukovich | 74/866 |
| 4,506,563 | 3/1985 | Hiramatsu | 74/867 |
| 4,524,645 | 6/1985 | Tatsumi | 74/866 |
| 4,653,350 | 3/1987 | Downs et al. | 74/866 X |
| 4,653,351 | 3/1987 | Downs et al. | 74/866 |
| 4,671,139 | 6/1987 | Downs et al. | 74/866 |
| 4,685,356 | 8/1987 | Iwatsuki | 74/866 |
| 4,707,789 | 11/1987 | Downs et al. | 74/866 X |
| 4,722,247 | 2/1988 | Shindo et al. | 74/866 |
| 4,726,261 | 2/1988 | Kato et al. | 74/866 |
| 4,730,519 | 3/1988 | Nakamura et al. | 74/866 |
| 4,733,581 | 3/1988 | Hasegawa et al. | 74/866 X |
| 4,793,216 | 12/1988 | Hiramatsu et al. | 74/866 |

Primary Examiner—Dirk Wright
Attorney, Agent, or Firm—Sixbey, Friedman, Leedom & Ferguson

[57] ABSTRACT

A control system for an automatic transmission employed in a vehicle comprises first and second engaging friction elements provided in the automatic transmission for giving rise to speed change, an operating oil pressure control device for applying operating oil pressure to each of the first and second engaging friction elements in accordance with a predetermined control characteristic so as to change engaging conditions of the first and second engaging friction elements, an information detector for obtaining information of the operating condition of the automatic transmission, and a timing control device for causing the operating oil pressure control device to be operative to adjust a time interval from a time at which the first engaging friction element is changed in its engaging condition to a later time at which the second engaging friction element is changed in its engaging condition in accordance with the information obtained from the information detector, with the information being the revolving speed of a turbine runner provided in a torque converter included in the transmission or information relative thereto, and the temperature of the operating oil or information relative thereto, which affect 2-3 and 3-2 shifts, respectively.

14 Claims, 9 Drawing Sheets

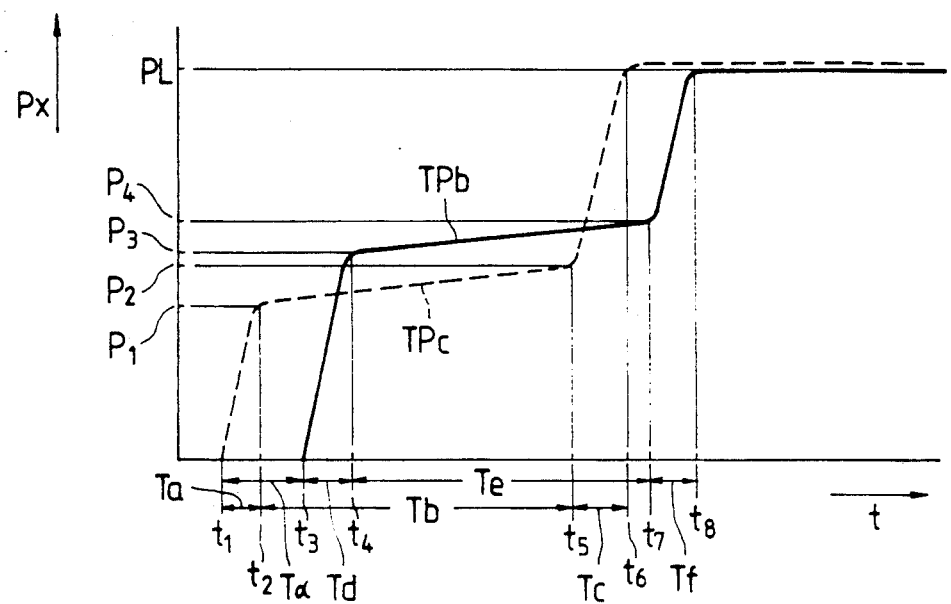
FIG. 3
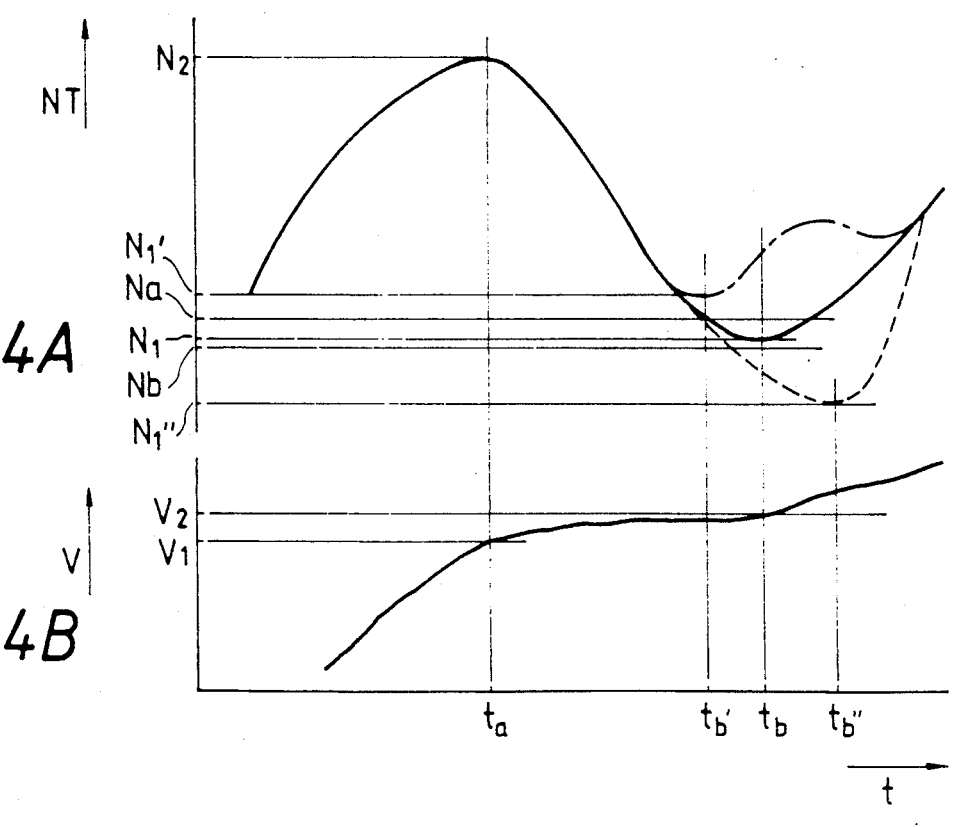
FIG. 4A
FIG. 4B

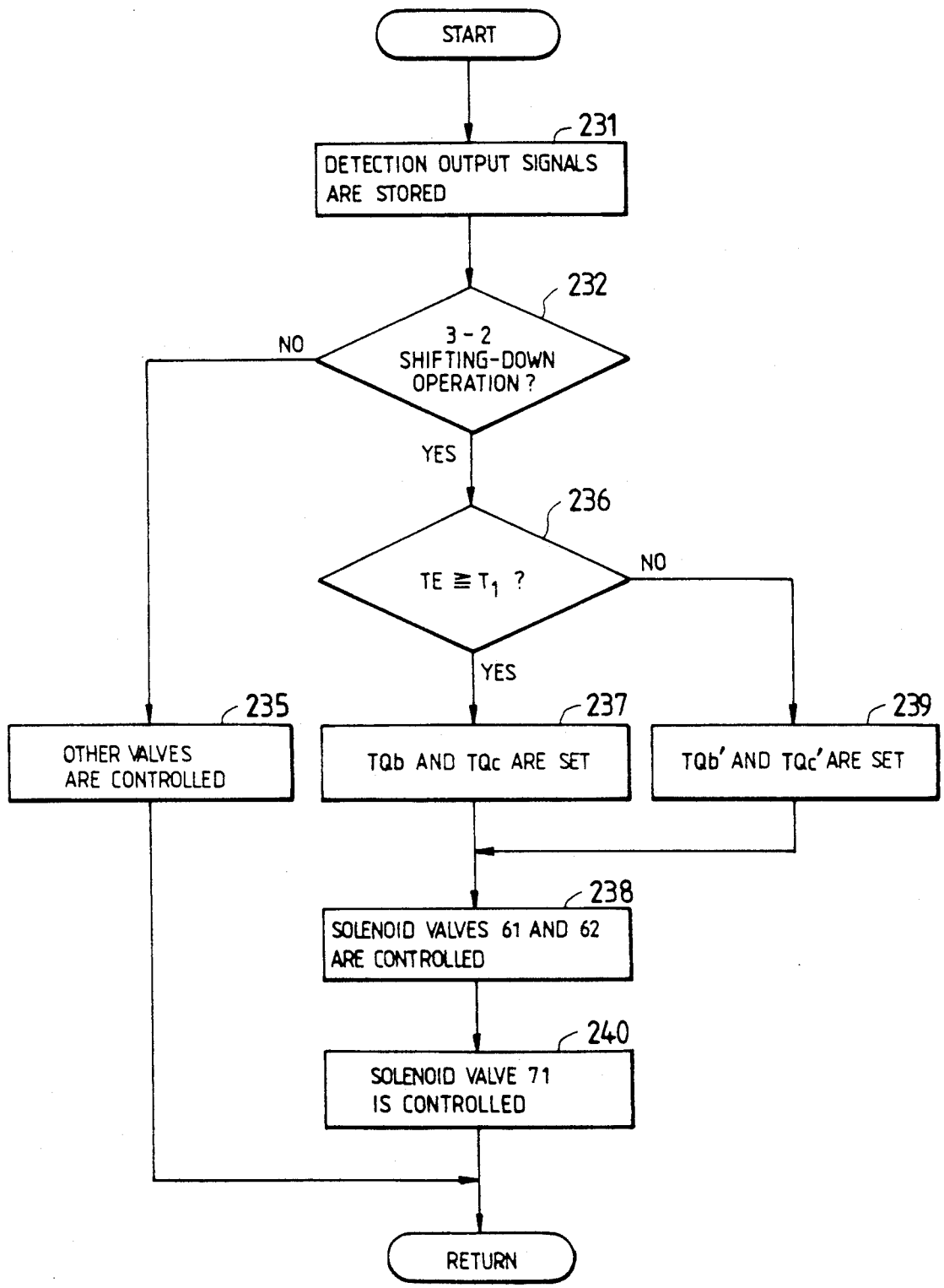

CONTROL SYSTEMS FOR AUTOMATIC TRANSMISSIONS

BACKGROUND OF THE INVENTION

1. Field of the Invention

The present invention relates generally to control systems for automatic transmissions employed in vehicles, and more particularly, to a system for controlling operations of engaging friction elements in an automatic transmission provided in a vehicle by means of oil pressure varied automatically in accordance with the operating condition of the automatic transmission.

2. Description of the Prior Art

There has been commonly used in vehicles an automatic transmission which is coupled with an engine provided in the vehicle and includes a torque converter comprising a pump impeller, a turbine runner and a stator, and a power transmitting gear arrangement including a speed change mechanism having engaging friction elements, such as clutch and brake elements, operating with oil pressure. Such an automatic transmission employed to be coupled with the engine in the vehicle is usually accompanied with a hydraulic pressure control device including an oil hydraulic control circuit for causing the engaging friction elements in the speed change mechanism to work.

When each speed change is carried out in the automatic transmission accompanied with the hydraulic pressure control device, oil pressure for causing the engaging friction elements in the speed change mechanism to work is supplied to each of the engaging friction elements through the oil hydraulic control circuit, as disclosed in, for example, U.S. Pat. No. 4,283,970 or U.S. Pat. No. 4,506,563. In the case where the speed change is completed by causing each of two engaging friction elements to be in engagement or disengagement selectively, it is required that controls for varying the oil pressure applied the respective engaging friction elements are performed individually. Further, in connection with such controls as performed individually, it is desired that the control for causing one of the engaging friction elements to be in engagement or disengagement by means of the oil pressure is carried out at an appropriate time after the control for causing the other of the engaging friction elements to be in its engaging or disengaging state by means of the oil pressure is completed so that shocks of great degree on a body of the vehicle and sudden rise in speed of an engine with which the automatic transmission is coupled, which are contingent to each speed change, are avoided.

However, in an actual automatic transmission which is employed to be coupled with an engine in a vehicle and in which controls for varying oil pressure applied two engaging friction elements are conducted individually for carrying out a selected speed change, it is feared that a time at which the control for causing one of the engaging friction elements to be in its engaging or disengaging state by means of the oil pressure is carried out after the control for causing the other of the engaging friction elements to be in its engaging or disengaging state by means of the oil pressure is completed is undesirably changed to be unsuitable owing to dispersion in characteristic of or aged deterioration in each of the engine, a torque converter contained in the automatic transmission, the engaging friction element and so on, after the time has been set appropriately once. Further, since an operating oil used for producing the oil pressure in a hydraulic pressure control device accompanying with the automatic transmission changes in viscosity in response to its temperature in such a manner that the viscosity increases when the temperature is relatively high and decreases when the temperature is relatively low, it has been quite difficult in conventional hydraulic pressure control devices to make such an arrangement that the control for causing one of the engaging friction elements to be in its engaging or disengaging state by means of the oil pressure is carried out at an appropriate time after the control for causing the other of the engaging friction elements to be in its engaging or disengaging state by means of the oil pressure is completed under both a condition in which the temperature of the operating oil is relatively low and a condition in which the temperature of the operating oil is relatively high.

OBJECTS AND SUMMARY OF THE INVENTION

Accordingly, it is an object of the present invention to provide a control system for an automatic transmission which avoids the aforementioned problems or disadvantages encountered with the prior art.

Another object of the present invention is to provide a control system for an automatic transmission employed in a vehicle, in which controls for varying oil pressure applied two engaging friction elements are conducted individually for carrying out a selected speed change, and the control for causing one of the engaging friction elements to be in its engaging or disengaging state by means of the oil pressure is carried out at an appropriate time after the control for causing the other of the engaging friction elements to be in its engaging or disengaging state by means of the oil pressure is completed, regardless of various changes in the operating condition of the automatic transmission.

A further object of the present invention is to provide a control system for an automatic transmission employed in a vehicle, in which controls for varying oil pressure applied two engaging friction elements are conducted individually for carrying out a selected speed change and a time at which the control for causing one of the engaging friction elements to be in its engaging or disengaging state by means of the oil pressure is carried out after the control for causing the other of the engaging friction elements to be in its engaging or disengaging state by means of the oil pressure is completed is automatically adjusted appropriately in accordance with variations in turbine speed in a torque converter included in the automatic transmission or variations in the temperature of an operating oil used for producing the oil pressure in a hydraulic pressure control device accompanying with the automatic transmission.

In accordance with the present invention, there is provided a control system for an automatic transmission employed in a vehicle comprising first and second engaging friction elements provided in the automatic transmission for giving rise to speed change, an operating oil pressure control device for applying operating oil pressure to each of the first and second engaging friction elements in accordance with a predetermined control characteristic so as to cause the first and second engaging friction elements to give rise to the speed change, an information detector for obtaining information of the operating condition of the automatic transmission, and a timing control device for causing the operating oil pressure control device to be operative to adjust a time interval from a time at which the first engaging friction element is changed in its engaging condition to a later time at which the second engaging friction element is changed in its engaging condition in accordance the information obtained from the information detector.

In one embodiment of control system according to the present invention, the information detector is operative to obtain information of the revolving speed of a turbine runner provided in a torque converter included in the automatic transmission or information relative to the revolving speed of the turbine runner.

Further, in another embodiment of control system according to the present invention, the information detector is operative to obtain information of the temperature of an operating oil contained in the operating oil pressure control device for producing the operating oil pressure or information relative to the temperature of the operating oil.

With the control system thus constituted in accordance with the present invention, a control for varying the operating oil pressure supplied to the first engaging friction element and a control for varying the operating oil pressure applied to the second engaging friction element are carried out individually, and a time at which the control for causing the second engaging friction element to be changed in its engaging condition is carried out after the control for causing the first engaging friction element to be changed in its engaging condition is completed is automatically adjusted in accordance with variations in the operating condition of the automatic transmission, such as variations in a turbine speed in a torque converter provided in the automatic transmission or variations in the temperature of the operating oil, so as to be kept appropriate regardless of dispersion in characteristic of or aged deterioration in each of the engine, the torque converter, the first and second engaging friction elements and so on, or variations in the temperature of the operating oil. Consequently, shocks of great degree on a body of the vehicle and sudden rise in speed of the engine with which the automatic transmission is coupled are surely prevented from arising on the occasion of the speed change.

The above, and other objects, features and advantages of the present invention will become apparent from the following detailed description which is to be read in conjunction with the accompanying drawings.

BRIEF DESCRIPTION OF THE DRAWINGS

FIGS. 3 to 6 are time charts used for explaining the operation of the embodiment shown in FIG. 1;

FIG. 12 is a flow chart showing an example of an operational program for a microcomputer used in a control unit employed in the embodiment shown in FIG. 9.

DESCRIPTION OF THE PREFERRED EMBODIMENTS

The invention will be now described by way of example with reference to the accompanying drawings.

Figure 1:
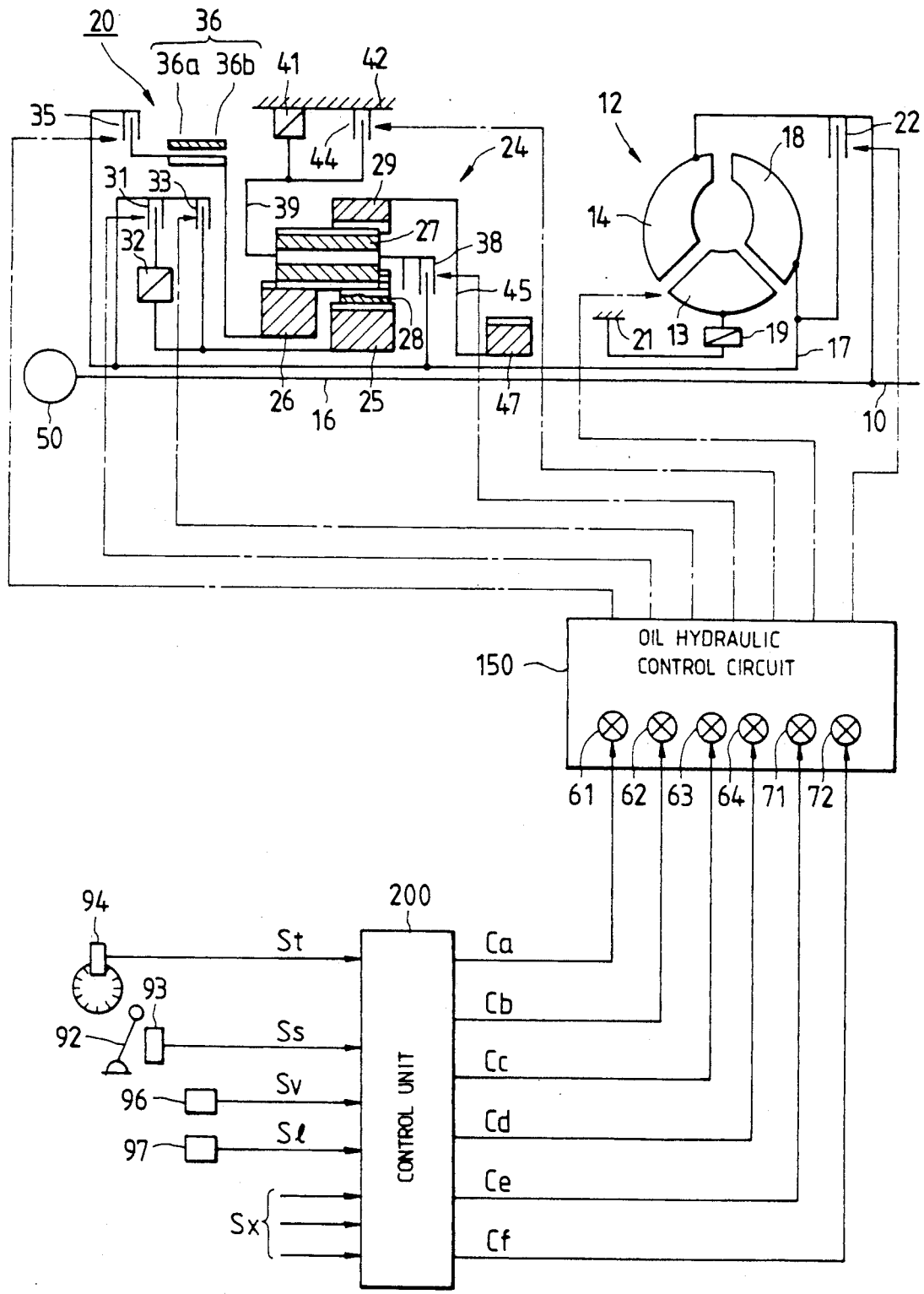
FIG. 1 is a schematic illustration showing one embodiment of control system for an automatic transmission according to the present invention, together with an example of an automatic transmission to which the embodiment is applied.

Referring to FIG. 1, an automatic transmission employed in a vehicle comprises a torque converter 12 coupled with an output shaft 10 of an engine, a power transmitting gear arrangement 20 provided at the output side of the torque converter 12, and an oil pump 50 coupled through a pump driving shaft 16 with the output shaft 10.

The torque converter 12 comprises a stator 13 coupled rotatably through a one-way clutch 19 with a case 21 of the torque converter 12, a pump impeller 14 secured to the output shaft 10, and a turbine runner 18 coupled through a tubular turbine shaft 17 with the power transmitting gear arrangement 20 and coupled also with a lock-up clutch 22 with the output shaft 10. The one-way clutch 19 permits the stator 13 to revolve only in a direction common to the revolution of the pump impeller 14.

The power transmitting gear arrangement 20 is provided with a planetary gear unit 24 for obtaining four forward speeds and one reverse speed. The planetary gear unit 24 comprises a small sun gear 25, a large sun gear 26, a long pinion gear 27, a short pinion gear 28 and a ring gear 29. A series connection of a forward clutch 31 for forward traveling and a one-way clutch 32 is disposed in parallel with a coast clutch 33 between the small sun gear 25 and the tubular turbine shaft 17. A reverse clutch 35 for reverse traveling and a 2-4 brake device 36 are connected in series between the large sun gear 26 and the tubular turbine shaft 17. The 2-4 brake device 36 comprises a brake drum 36a connected to the large sun gear 26 and a brake band 36b operative to engage with the brake drum 36a. A 3-4 clutch 38 is provided between the long pinion gear 27 and the tubular turbine shaft 17, and the long pinion gear 27 is coupled through a carrier 39 of the planetary gear unit 24 and a one-way clutch 41 with a case 42 of the power transmitting gear arrangement 20. The carrier 39 is selectively engaged through a low/reverse brake device 44 with the case 42. The ring gear 29 is connected through an output shaft 45 of the planetary gear unit 24 to an output gear 47.

The automatic transmission, which includes the torque converter 12, the power transmitting gear arrangement 20 and the oil pump 50 arranged as described above, is accompanied with an hydraulic pressure control arrangement comprising an oil hydraulic control circuit 150 provided with solenoid valves 61, 62, 63, 64, 71 and 72 for supplying various portions of the automatic transmission selectively with operating oil pressure which is obtained from the oil pump 50 operative to compress an operating oil and a control unit 200 for controlling the solenoid valves 61 to 64, 71 and 72 in the oil hydraulic control circuit 150. The control unit 200 is supplied with a detection output signal St obtained from a turbine speed sensor 94 for detecting revolving speed of the turbine runner 18, a detection output signal Ss obtained from a shift position sensor 93 for detecting a position of a shift lever 92, a detection output signal Sv obtained from a speed sensor 96 for detecting traveling speed of the vehicle, a detection output signal $S_l$ obtained from a load sensor 97 for detecting an engine load, and other necessary detection output signals Sx, and operative to supply the solenoid valves 61 to 64 respectively with driving pulse signals Ca, Cb, Cc and Cd produced based on the detection output signals St, Ss, Sv, $S_l$, and supply also the solenoid valves 71 and 72 respectively with control signals Ce and Cf produced based on the detection output signals Sv and $S_l$.

In the power transmitting gear arrangement 20 constituted as described above, a plurality of shift ranges including P (parking) range, R (reverse) range, N (neutral) range, D (driving) range, 1st range and 2nd range, and a plurality of speeds including 1st to 4th speeds at the D range, 1st to 3rd speeds at the 2nd range, and 1st and 2nd speeds at the 1st range, are obtained by causing the forward clutch 31, coast clutch 33, reverse clutch 35, 3-4 clutch 38, 2-4 brake device 36 and low/reverse brake device 44, each of which is formed into an engaging friction element, to work selectively.

In the following Table 1, there are given the relationship in operation of the respective shift ranges and speeds with the clutches and brake devices in the above configuration:

TABLE 1

| Shift range | | Clutch | | | | Brake device | | One-way clutch | |
|---|---|---|---|---|---|---|---|---|---|
| | | 31 | 33 | 38 | 35 | 36 | 44 | 32 | 41 |
| P | | | | | | | | | |
| R | | | | | o | | o | | |
| N | | | | | | | | | |
| D | 1st speed | o | | | | | | o | o |
| | 2nd speed | o | o | | | o | | o | |
| | 3rd speed | o | o | o | | | | o | |
| | 4th speed | o | | o | | o | | (o) | |
| 2nd | 1st speed | o | | | | | | o | o |
| | 2nd speed | o | o | | | o | | o | |
| | 3rd speed | o | o | o | | | | o | |
| 1st | 1st speed | o | o | | | | o | o | |
| | 2nd speed | o | o | | | o | | o | |

In Table 1, each circular marx:o represents that the device is held in engagement to transmit power and a parenthesized circular mark:(o) represent that the device is held in engagement without participating in power transmission.

Figure 2:
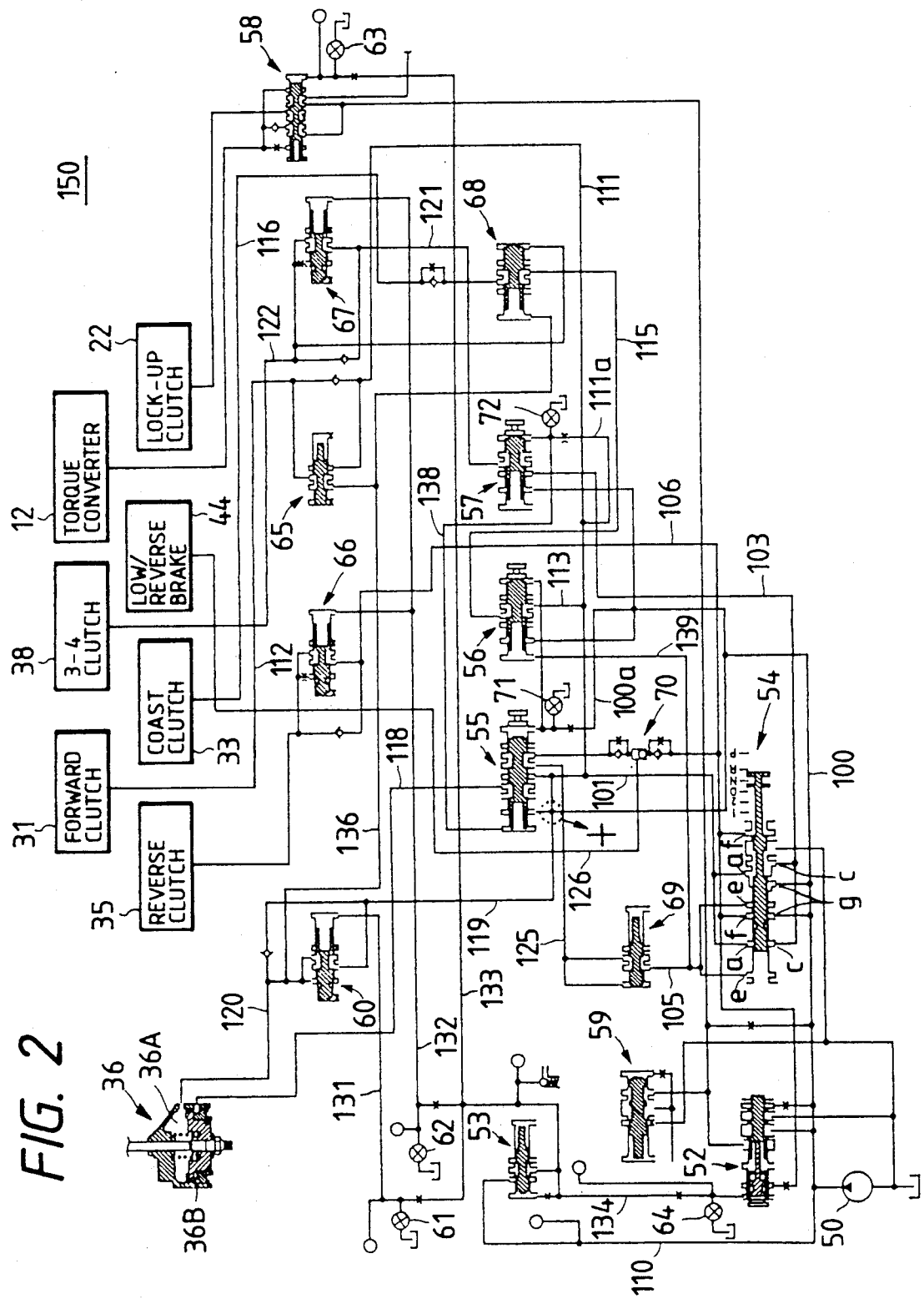
FIG. 2 is a partial development showing an example of an oil hydraulic control circuit arrangement employed in the embodiment shown in FIG. 1.

FIG. 2 shows an example of the oil hydraulic control circuit 150 used in the hydraulic pressure control arrangement accompanying with the automatic transmission shown in FIG. 1 and described above.

In this example, the oil pump 50 is driven by the output shaft 10 of the engine for compressing an operating oil to produce operating oil pressure. The operating oil pressure obtained from the oil pump 50 is adjusted to a appropriate value by a pressure regulator valve 52 and then led through a pressure line 100 and branch lines therefrom to each of a manual shift valve 54, a 1-2 shift valve 55, a coast-exhaust valve 56, a 2-3 shift valve 57, a lock-up control valve 58, a converter relief valve 59 and a servocontrol valve 60 as line pressure.

The manual shift valve 54 has 1st, 2nd, D, N, R and P shift range positions, each of which is selected by handling manually the shift lever 92, and also output ports a, c, e and f in addition to an input port g connected to the pressure line 100. When the manual shift valve 54 is in the 1st shift range position, the input port g is permitted to communicate with the forward clutch 31 through the output port a, pressure lines 101 and 111, a forward control valve 65 and a pressure line 112, with the coast clutch 33 through the output port a, the pressure line 101 and 111, a pressure line 113, the coast-exhaust valve 56, a pressure line 115, a coast control valve 68 and a pressure line 116, with an applying chamber 36B of the 2-4 brake device 36 through the output port a, the pressure line 101, the 1-2 shift valve 55 and a pressure line 118, with a releasing chamber 36A of the 2-4 brake device 36 through the output port a, the pressure line 101, a pressure line 119, the servocontrol valve 60 and a pressure line 120, with the low/reverse brake device 44 through the output port e, a pressure line 105, a pressure reducing valve 69, a pressure line 125, the 1-2 shift valve 55, a switching valve 70 and a pressure line 126, and with the coast-exhaust valve 56 through the output port e and a pressure line 139.

When the manual shift valve 54 is in the 2nd or D shift range position, the input port g is permitted to communicate with each of the forward clutch 31, the coast clutch 33, and the applying and releasing chambers of the 2-4 brake device 36 in the same manner as the case in which the manual shift valve 54 is in the 1st shift range position, and also with the 3-4 clutch 38 through the output port c, a pressure line 103, a 2-3 shift valve 57, a pressure line 121, a 3-4 control valve 67 and a pressure line 122. When the manual shift valve 54 is in the R shift range position, the input port g is permitted to communicate with the low/reverse brake device 44 through the output port f, a pressure line 106, the switching valve 70 and the pressure line 126, and with the reverse clutch 35 through the output port f, the pressure line 106 and a reverse control valve 66.

When the manual shift valve 54 is in the N or P shift range position, the input port g is not permitted to communicate with the output ports a, c, e nor f, and therefore each of the forward clutch 31, coast clutch 33, reverse clutch 35, 2-4 brake device 36, 3-4 clutch 38, low/reverse brake device 44 and lock-up clutch 22 is kept in disengagement so that the turbine runner 18 idles.

Further, the operating oil pressure obtained from the oil pump 50 is also led through a pressure line 110 to a pressure reducing valve 53 to be reduced to have a predetermined value therein and then the reduced operating oil pressure from the pressure reducing valve 53 is adjusted to an appropriate value by each of the solenoid valves 61 to 64. The adjusted operating oil pressures obtained from the solenoid valves 61 to 64 are respectively led to the servocontrol valve 60 through a pressure line 131, to both the reverse control valve 66 and the 3-4 control valve 67 through a pressure line 132, to the lock-up control valve 58 through a pressure line 133, and to the pressure regulator valve 52 through a pressure line 134 as pilot pressures.

The servocontrol valve 60 is operative to adjust the operating oil pressure led thereto through a pressure line 120 from the releasing chamber 36A of the 2-4 brake device 36 and the adjusted operating oil pressure from the servocontrol valve 60 is applied through a pressure line 136 to the coast control valve 68 as pilot pressure and also to a forward control valve 65.

The 2-3 shift valve 57 receives a pilot pressure applied thereto through a pressure line 111a branched from the pressure line 111. The pilot pressure toward the 2-3 shift valve 57 is controlled by the solenoid valve 72 so as to be applied to the 2-3 shift valve 57 when the solenoid valve 72 is in its OFF state and so as not to be applied to the 2-3 shift valve 57 when the solenoid valve 72 is in its ON state. The pilot pressure which is applied to the 2-3 shift valve 57 is also applied through a pressure line 138 to the 1-2 shift valve 55, and therefore the 1-2 shift valve 55 receives with both the pilot pressure applied thereto through the pressure line 138 and a pilot pressure applied thereto through a pressure line 100a branched from the pressure line 100. The pilot pressure toward the 1-2 shift valve 55 through the pressure line 100a is controlled by the solenoid valve 71 so as to be applied to the 1-2 shift valve 55 when the solenoid valve 71 is in its OFF state and so as not to be applied to the 1-2 shift valve 55 when the solenoid valve 71 is in its ON state. When the pilot pressure is applied through the pressure line 138 to the 1-2 shift valve 55, a spool in the 1-2 shift valve 55 is moved to the right in FIG. 2 so that the pressure line 101 is connected with the pressure line 118 regardless of the operation of the solenoid valve 71.

In the following Table 2, there are given the relationship in operation of the respective shift ranges and speeds with the solenoid valves 71 and 72:

TABLE 2

| Shift range | | Solenoid valve | |
|---|---|---|---|
| | | 71 | 72 |
| P | | | o |
| R | | o | |
| N | | o | o |
| D | 1st speed | | o |
| | 2nd speed | o | o |
| | 3rd speed | o | |
| | 4th speed | o | |
| 2nd | 1st speed | | o |
| | 2nd speed | o | o |
| | 3rd speed | o | |
| 1st | 1st speed | | o |
| | 2nd speed | o | o |

In Table 2, each circular mark:o represents that the solenoid valve is in its ON state.

The pilot pressure controlled by the solenoid valve 71 is applied also to the coast-exhaust valve 56 to which another pilot pressure is applied through the output port e of the manual shift valve 54 and the pressure line 139 when the manual shift valve 54 is in the 1st shift range position. The coast-exhaust valve 56 is operative to cause the operating pressure to be applied selectively to the coast clutch 33 in response to application of each pilot pressure thereto.

The solenoid valves 61 to 64 are controlled respectively by the driving pulse signals Ca, Cb, Cc and Cd supplied from the control unit 200 to be put in the ON state selectively and similarly the solenoid valves 71 and 72 are controlled respectively by the control signals Ce and Cf supplied from the control unit 200 to be put in the ON state selectively. With the operations of the solenoid valves 61 to 64, 71 and 72, the pilot pressure applied to each of the servocontrol valve 60, reverse control valve 66, 3-4 control valve 67, lock-up control valve 58, pressure regulator valve 52, 1-2 shift valve 55 and 2-3 shift valve 57 is adjusted, so that the forward clutch 31, coast clutch 33, reverse clutch 35, 3-4 clutch 38, 2-4 brake device 36 and low/reverse brake device 44 in the automatic transmission are put in engagement selectively in such a manner as shown in Table 1 to provide a selected shift range and a selected speed.

When the shift lever 92 is at the 1st range, 2nd range or D range position, the control unit 200 is operative to collate the traveling speed of the vehicle represented by the detection output signal Sv and the engine load represented by the detection output signal $S_l$ with a shift pattern stored in a memory contained therein and to carry out a speed change control in accordance with the result of collation. Upon the speed change control, the control unit 200 performs, for example, a speed change to the 3rd speed from the 2nd speed, that is, 2-3 shifting-up operation, under a situation in which the shift lever 92 is at the D range or 2nd range position in the manner as described below.

During the 2nd speed, the control unit 200 supplies the solenoid valves 71 and 72 with the control signals Ce and Cf respectively to keep each of the solenoid valves 71 and 72 in its ON state and also supplies the solenoid valves 61 and 62 with the driving pulse signals Ca and Cb each of which has its pulse duty reduced to the minimum so as to cause each of the solenoid valves 61 and 62 to have the maximum opening period, so that the pilot pressure applied to each of the servocontrol valve 60 and the 3-4 control valve 67 is caused to have a minimum value. Therefore, the operating oil pressure is not applied to the 3-4 clutch 38 and the releasing chamber 36A of the 2-4 brake device 36, so that the 3-4 clutch 38 is held in disengagement and the 2-4 brake device 36 is held in engagement.

Then, when the traveling speed represented by the detection output signal Sv or the engine load represented by the detection output signal $S_l$ indicates that the 2-3 shifting-up operation should be carried out, the control unit 200 ceases to supply the solenoid valves 71 and 72 with the control signals Ce and Cf to cause each of the solenoid valves 71 and 72 to be in its ON state, and simultaneously increases the pulse duty of each of the driving control signals Cb and Ca to increase the operating oil pressure applied to each of the 3-4 clutch 38 and the releasing chamber 36A of the 2-4 brake device 36, so that the 3-4 clutch 38 is changed to be in engagement and the 2-4 brake device 36 is changed to be in disengagement.

In such control for the 2-3 shifting-up operation conducted by the control unit 200, a reference target oil pressure TPc for the 3-4 clutch 38 and a reference target oil pressure TPb for the releasing chamber 36A of the 2-4 brake device 36 are set as shown with broken and solid lines respectively in FIG. 3 in which an ordinate represents oil pressure Px and an abscissa represents time t.

The reference target oil pressure TPc is determined to be zero at an instant $t_1$ at which the 2-3 shifting-up operation is commenced, to increase rapidly to P1 during a period of time Ta between the instant $t_1$ and an instant $t_2$ later than the instant $t_1$, to increase gently to P2 which is larger slightly than P1 during a period of time Tb between the instant $t_2$ and an instant $t_5$ later than the instant $t_2$, and to increase further rapidly to PL which is a maximum value during a period of time Tc between the instant $t_5$ and an instant $t_6$ later than the instant $t_5$. The reference target oil pressure TPb is determined to be zero during a period of time Ta between the instant $t_1$ and $t_3$ later than $t_1$, to increase rapidly to P3 larger than P2 during a period of time Td between the instant $t_3$ and an instant $t_4$ later than the instant $t_3$, to increase gently to P4 which is larger slightly than P3 during a period of time Te between the instant $t_4$ and an instant $t_7$ later than the instant $t_4$, and to increase further rapidly to PL which is a maximum value during a period of time Tf between the instant $t_7$ and an instant $t_8$ later than the instant $t_7$.

Under an ideal condition in which it is not required to give consideration to dispersion in characteristic of or aged deterioration in each of the engine and the automatic transmission or variations in the temperature of the operating oil, the control unit 200 produces the driving pulse signal Cb having its pulse duty which varies to correspond to the reference target oil pressure TPc set as mentioned above and the driving pulse signal Ca having its pulse duty which varies to correspond to the reference target oil pressure TPb set as mentioned above, and these driving pulse signals Cb and Ca are supplied to the solenoid valves 62 and 61, respectively. As a result, the operating oil pressure applied to the 3-4 clutch 38 and the operating oil pressure applied to the releasing chamber 36A of the 2-4 brake device 36 are increased to follow respectively the increase in the reference target oil pressure TPb and the increase in the reference target oil pressure TPc after the instant $t_1$. With the operating oil pressure thus varied, the 3-4 clutch 38 is controlled to enter into slipping rapidly from a disengaging state before the control during the period of time Ta, to come into engagement gradually during the period of time Tb, and then to complete the engagement rapidly to be in an engaging state after the control during the period of time Tc, and the 2-4 brake device 36 is controlled to enter into slipping rapidly from an engaging state before the control during the period of time Td, to come into disengagement gradually during the period of time Te, and then to complete the disengagement rapidly to be in a disengaging state after the control during the period of time Tf.

In the 2-3 shifting-up operation in which the 3-4 clutch 38 is caused to be in engagement and the 2-4 brake device 36 is caused to be in disengagement in such a manner as described above, the 2-4 brake device 36 comes into disengagement at an appropriate time after the 3-4 clutch 38 is completed to be in engagement, so that a turbine speed NT (the revolving speed of the turbine runner 18) varies as shown with a solid line in FIG. 4A.

In FIG. 4B, variations in a vehicle traveling speed V (the traveling speed of the vehicle) during a period of time including the period of the 2-3 shifting-up operation are shown with a solid line.

In FIGS. 4A and 4B, after an instant $t_a$ which corresponds to the instant $t_1$ and at which the vehicle traveling speed V reaches V1 with which the 2-3 shifting-up operation should be carried out, the turbine speed NT decreases from N2 gradually in accordance with a difference between change gear ratios at the 2nd speed and the 3rd speed because the 3-4 clutch 38 is caused gradually to be in engagement and the 2-4 brake device 36 is caused gradually to be in disengagement, and reaches N1 which is a minimum value at an instant $t_b$ at which the 3-4 clutch 38 has been engaged completely and the 2-4 brake device 36 has been disengaged completely, then increases after the instant $t_b$. During a period of time between the instant $t_a$ and the instant $t_b$, the vehicle traveling speed V increases slightly from V1 to V2.

Apart from the ideal condition as described above, under an actual condition in which the dispersion in characteristic of or the aged deterioration in each of the engine and the automatic transmission or the variations in the temperature of the operating oil should be taken into consideration, it is feared that a time at which the 2-4 brake device 36 comes into disengagement after the 3-4 clutch 38 is completed to be held in engagement is undesirably changed to be unsuitable owing to the dispersion in characteristic of or the aged deterioration in each of the engine and the automatic transmission or the variations in the temperature of the operating oil, even though the operating oil pressure applied to the 3-4 clutch 38 and the operating oil pressure applied to the releasing chamber 36A of the 2-4 brake device 36 are controlled to vary in accordance with the reference target oil pressure TPb and the reference target oil pressure TPc, respectively.

In the case where the 2-4 brake device 36 comes into disengagement at an unsuitable time, if such an unsuitable time is earlier then the appropriate time after the 3-4 clutch 38 is completed to be held in engagement, the turbine speed NT reaches N1' which is a minimum value and larger than N1 at an instant $t_b'$ earlier than the instant $t_b$, as shown with a dot-dash line in FIG. 4A and consequently sudden rise in the turbine speed NT arises undesirably, and if the unsuitable time is later then the appropriate time after the 3-4 clutch 38 is completed to be held in engagement, the turbine speed NT reaches N1" which is a minimum value and smaller than N1 at an instant $t_b''$ later than the instant $t_b$, as shown with a broken line in FIG. 4A and consequently falling in the turbine speed NT arises undesirably. Such sudden rise and falling in the turbine speed TN result in undesirable sudden rise in speed of the engine and undesirable shocks of great degree on a body of the vehicle.

Accordingly, on the occasion of the 2-3 shifting-up operation in a condition of actual traveling of the vehicle, the following control operations are carried out by the control unit 200 in order to avoid the problems raised by the dispersion in characteristic of or the aged deterioration in each of the engine and the automatic transmission or the variations in the temperature of the operating oil.

First, the operating oil pressure applied to the 3-4 clutch 38 and the operating oil pressure applied to the releasing chamber 36A of the 2-4 brake device 36 are controlled in accordance with the reference target oil pressure TPb and the reference target oil pressure TPc as shown in FIG. 3, respectively. Then, in the control unit 200, a value of the turbine speed NT at the termination of the 2-3 shifting-up operation, that is, a minimum value of the turbine speed NT, is detected by obtaining a value of the turbine speed NT at which a rate of change of the turbine speed TN becomes zero first, and it is checked whether the detected minimum value resides in a range between Na which is larger than and close to N1 and Nb which is smaller than and close to N1, as shown in FIG. 4A, or not. If the detected minimum value of the turbine speed NT resides in the range between Na and Nb, it is recognized that the 2-3 shifting-up operation has been done appropriately and therefore such an arrangement that the reference target oil pressure TPb and the reference target oil pressure TPc are used for controlling the operating oil pressure applied to the 3-4 clutch 38 and the operating oil pressure applied to the releasing chamber 36A of the 2-4 brake device 36, respectively, on the occasion of later 2-3 shifting-up operations.

Figure 5:
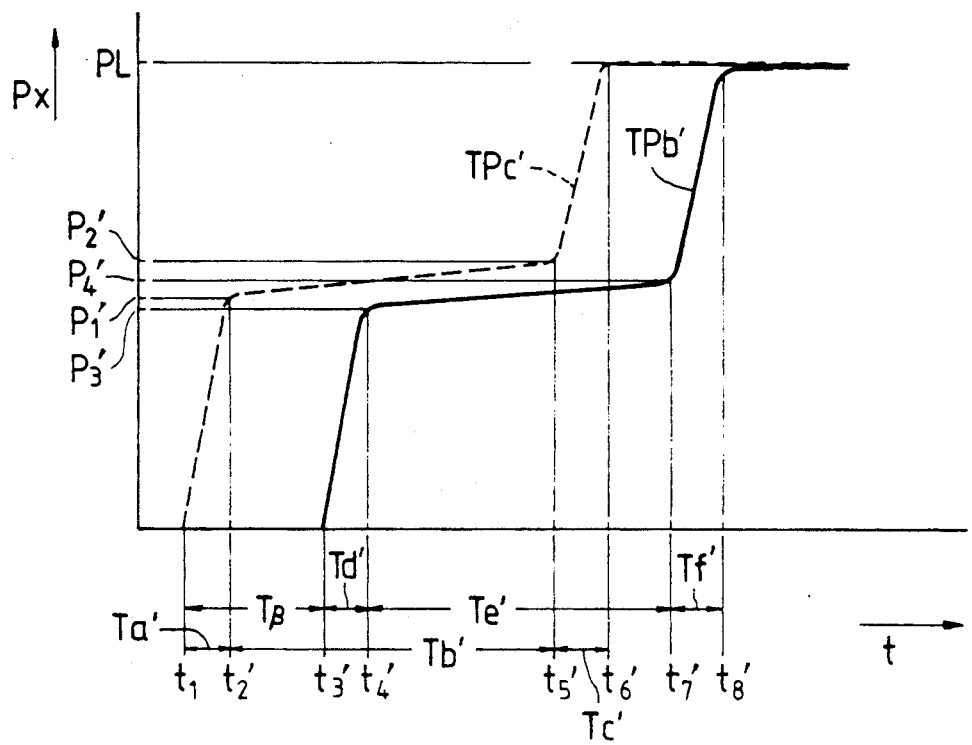

On the other hand, in the case where it is clarified that the detected minimum value of the turbine speed NT is not in the range between Na and Nb but larger than Na, a modified target oil pressure TPc' for the 3-4 clutch 38 and a modified target oil pressure TPb' for the releasing chamber 36A of the 2-4 brake device 36 are set as shown with broken and solid lines respectively in FIG. 5 to be used for later 2-3 shifting-up operations. To the contrary, in the case where it is clarified that the detected minimum value of the turbine speed NT is not in the range between Na and Nb but smaller than Nb, a modified target oil pressure TPc" for the 3-4 clutch 38 and a modified target oil pressure TPb" for the releasing chamber 36A of the 2-4 brake device 36 are set as shown with broken and solid lines respectively in FIG. 6 to be used for later 2-3 shifting-up operations.

The modified target oil pressure TPc' is determined to be zero at an instant $t_1$ at which the 2-3 shifting-up operation is commenced, to increase rapidly to P1', which is larger than P1 shown in FIG. 3, during a period of time Ta', which is longer than Ta shown in FIG. 3, between the instant $t_1$ and an instant $t_2'$ later than the instant $t_1$, to increase gently to P2', which is larger than P2 shown in FIG. 2, during a period of time Tb', which is shorter than Tb shown in FIG. 3, between the instant $t_2'$ and an instant $t_5'$ later than the instant $t_2'$, and to increase further rapidly to PL which is a maximum value during a period of time Tc', which is longer than Tc shown in FIG. 3, between the instant $t_5'$ and an instant $t_6'$ later than the instant $t_5'$. The modified target oil pressure TPb' is determined to be zero during a period of time $T\beta$, which is longer than $T_\alpha$ shown in FIG. 3, between the instant $t_1$ and an instant $t_3'$ later than $t_1$, to increase rapidly to P3', which is smaller than P3 shown in FIG. 3, during a period of time Td', which is shorter than Td shown in FIG. 3, between the instant $t_3'$ and an instant $t_4'$ later than the instant $t_3'$, to increase gently to P4', which is smaller than P4 shown in FIG. 3, during a period of time Te', which is shorter than Te shown in FIG. 3, between the instant $t_4'$ and an instant $t_7'$ later than the instant $t_4'$, and to increase further rapidly to PL which is a maximum value during a period of time Tf', which is longer than Tf shown in FIG. 3, between the instant $t_7'$ and an instant $t_8'$ later than the instant $t_7'$.

In the 2-3 shifting-up operation in which the operating oil pressure applied to the 3-4 clutch 38 and the operating oil pressure applied to the releasing chamber 36A of the 2-4 brake device 36 are controlled to vary in accordance with the modified target oil pressure TPb' and the modified target oil pressure TPc', respectively, the 3-4 clutch 38 is controlled to enter into slipping rapidly from a disengaging state before the control during the period of time Ta', to come into engagement gradually during the period of time Tb', and then to complete the engagement rapidly to be in an engaging state after the control during the period of time Tc', and the 2-4 brake device 36 is controlled to enter into slipping rapidly from an engaging state before the control during the period of time Td', to come into disengagement gradually during the period of time Te', and then to complete the disengagement rapidly to be in a disengaging state after the control during the period of time Tf'. Accordingly, the 3-4 clutch 38 is caused to be in engagement at a time earlier than the time at which the 3-4 clutch 38 is caused to be in engagement in the case wherein the reference target oil pressure TPb and the reference target oil pressure TPc are used, and the 2-4 brake device 36 is caused to be in disengagement at a time later than the time at which the 2-4 brake device 36 is caused to be in disengagement in the case wherein the reference target oil pressure TPb and the reference target oil pressure TPc are used, so that the 2-4 brake device 36 comes into disengagement at an appropriate time after the 3-4 clutch 38 is completed to be held in engagement and therefore undesirable sudden rise in the turbine speed NT is avoided.

The modified target oil pressure TPc" is determined to be zero at an instant $t_1$ at which the 2-3 shifting-up operation is commenced, to increase rapidly to P1', which is smaller than P1, during a period of time Ta", which is shorter than Ta, between the instant $t_1$ and an instant $t_2''$ later than the instant $t_1$, to increase gently to P2", which is smaller than P2, during a period of time Tb", which is almost equal to Tb, between the instant $t_2''$ and an instant $t_5''$ later than the instant $t_2''$, and to increase further rapidly to PL which is a maximum value during a period of time Tc", which is shorter than Tc, between the instant $t_5''$ and an instant $t_6''$ later than the instant $t_5''$. The modified target oil pressure TPb" is determined to be zero during a period of time $T\gamma$, which is shorter than $T_\alpha$, between the instant $t_1$ and an instant $t_3''$ later than $t_1$, to increase rapidly to P3", which is larger than P3, during a period of time Td", which is longer than Td, between the instant $t_3''$ and an instant $t_4''$ later than the instant $t_3''$, to increase gently to P4", which is larger than P4, during a period of time Te", which is longer than Te, between the instant $t_4''$ and an instant $t_7''$ later than the instant $t_4''$, and to increase further rapidly to PL which is a maximum value during a period of time Tf", which is shorter than Tf, between the instant $t_7''$ and an instant $t_8''$ later than the instant $t_7''$.

In the 2-3 shifting-up operation in which the operating oil pressure applied to the 3-4 clutch 38 and the operating oil pressure applied to the releasing chamber 36A of the 2-4 brake device 36 are controlled to vary in accordance with the modified target oil pressure TPb" and the modified target oil pressure TPc", respectively, the 3-4 clutch 38 is controlled to enter into slipping rapidly from a disengaging state before the control during the period of time Ta", to come into engagement gradually during the period of time Tb", and then to complete the engagement rapidly to be in an engaging state after the control during the period of time Tc", and the 2-4 brake device 36 is controlled to enter into slipping rapidly from an engaging state before the control during the period of time Td", to come into disengagement gradually during the period of time Te", and then to complete the disengagement rapidly to be in a disengaging state after the control during the period of time Tf". Accordingly, the 3-4 clutch 38 is caused to be in engagement at a time later than the time at which the 3-4 clutch 38 is caused to be in engagement in the case wherein the reference target oil pressure TPb and the reference target oil pressure TPc are used, and the 2-4 brake device 36 is caused to be in disengagement at a time earlier than the time at which the 2-4 clutch 36 is caused to be in disengagement in the case wherein the reference target oil pressure TPb and the reference target oil pressure TPc are used, so that the 2-4 brake device 36 comes into disengagement at an appropriate time after the 3-4 clutch 38 is completed to be held in engagement and therefore undesirable falling in the turbine speed NT is avoided.

With the control for varying the operating oil pressure applied to each of the 3-4 clutch 38 and the releasing chamber 36A of the 2-4 brake device 36 in accordance with the turbine speed NT performed as described above, undesirable sudden rise in speed of the engine and undesirable shocks of great degree on the body of the vehicle can be prevented effectively on the occasion of the 2-3 shifting-up operation.

Figure 7:
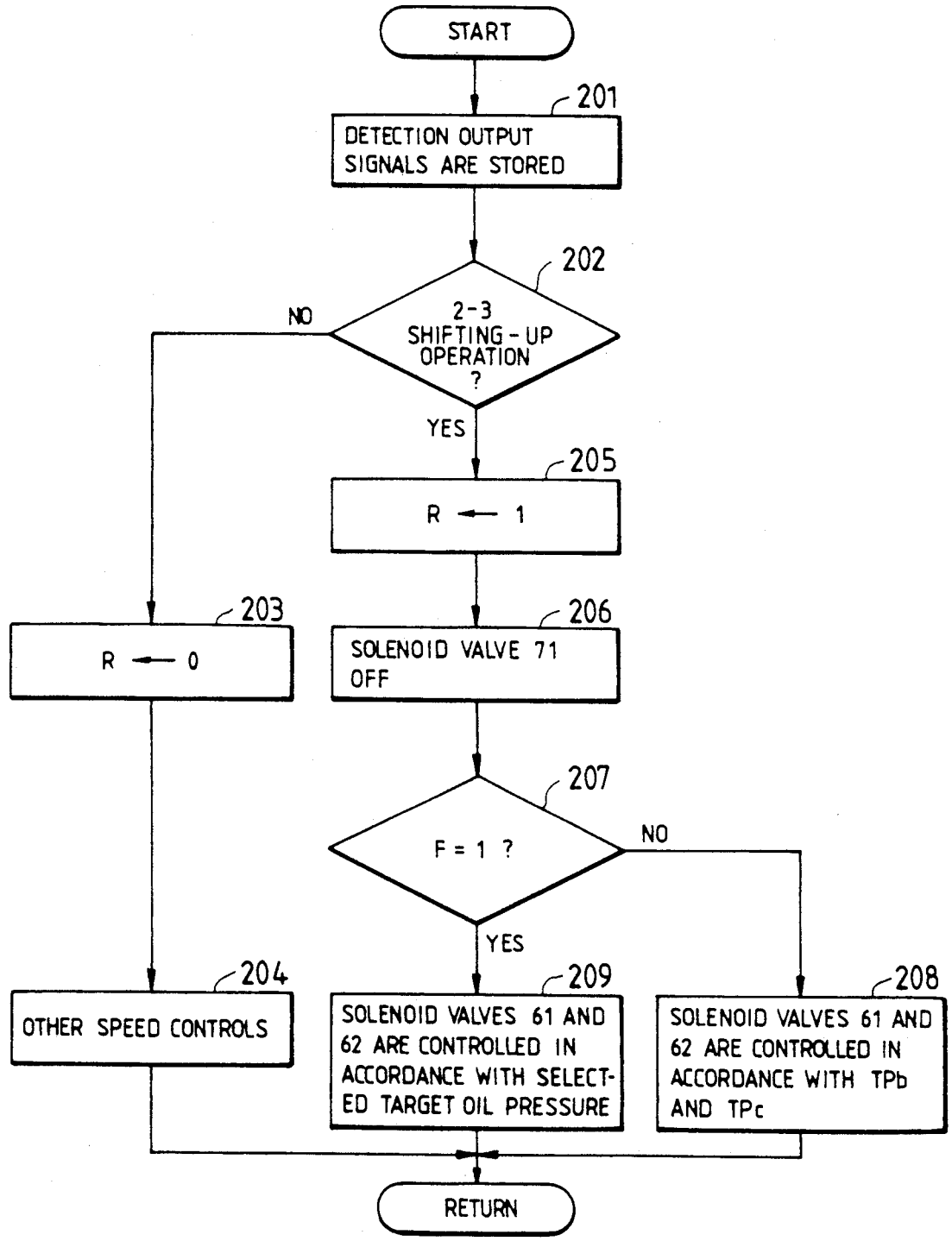
FIGS. 7 and 8 are flow charts showing an example of an operational program for a microcomputer used in a control unit employed in the embodiment shown in FIG. 1.
Figure 8:
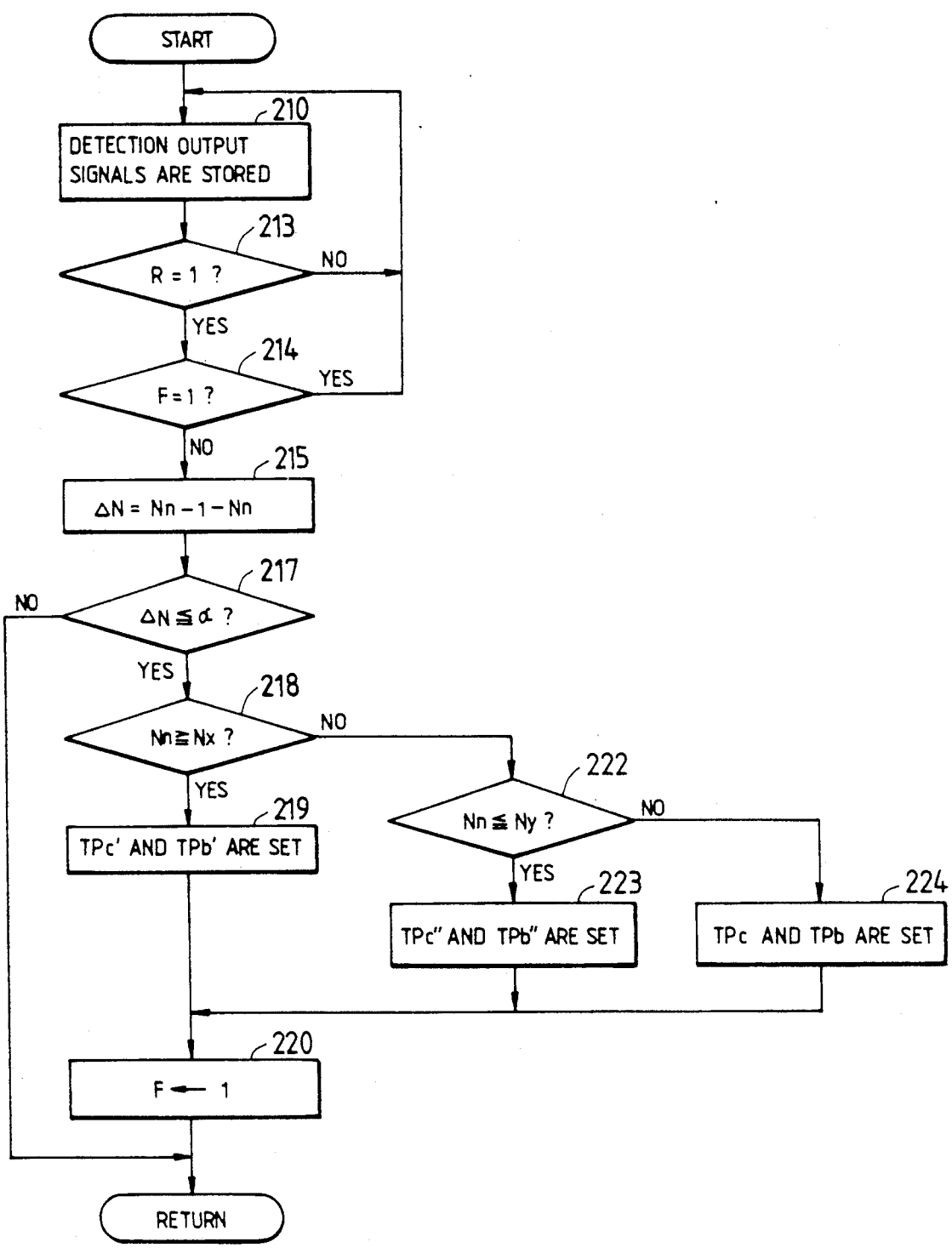

The operations of the control unit 200 for controlling the operating oil pressure as described above are performed in accordance with, for example, flow charts shown in FIGS. 7 and 8.

The flow chart of FIG. 7 shows a program for a fundamental speed change control. In the control according to the flow chart of FIG. 7, first, the detection output signals St, Sv, Ss, S$_l$ and Sx are stored in process 201. Next, in decision 202, it is checked whether the 2-3 shifting-up operation is to be carried out or not based on a shifting pattern previously stored in a memory contained in the control unit 200, the vehicle traveling speed V represented by the detection output signal Sv, the engine load represented by the detection output signal S$_l$, and the position of the shift lever 92 represented by the detection output signal Ss. If the 2-3 shifting-up operation is not to be carried out, a 2-3 shifting-up flag R is reset to be zero in process 203, then speed controls other than the 2-3 shifting-up operation are carried out in process 204, and the step returns to the process 201. To the contrary, if the 2-3 shifting-up operation is to be carried out, the 2-3 shifting-up flag R is set to be 1 in process 205, then the solenoid valve 71 is caused to be in its OFF state in process 206.

Then, in decision 207, it is checked whether a pressure setting flag F is 1 or not. The pressure flag F of 1 indicates that the modified target oil pressures TPc' and TPb' or TPc'' and TPb'' or the reference target oil pressures TPc and TPb have been already set. As a result of the check in the decision 207, if it is clarified that the flag is not 1, the driving pulse signal Cb produced to have its pulse duty corresponding to the reference target oil pressure TPc and the driving pulse signal Ca produced to have its pulse duty corresponding to the reference target oil pressure TPb are supplied to the solenoid valves 62 and 61, respectively, so that the solenoid valve 62 is controlled in accordance with the reference target oil pressure TPc to apply the operating oil pressure controlled to vary in accordance with the reference target oil pressure TPc to the 3-4 clutch 38 and the solenoid valve 61 is controlled in accordance with the reference target oil pressure TPb to apply the operating oil pressure controlled to vary in accordance with the reference target oil pressure TPb to the 2-4 brake device 36, in process 208, and then the step returns to the process 201.

On the other hand, if it is clarified in the decision 207 that the flag is 1, the driving pulse signals Cb produced to have its pulse duty corresponding to the modified target oil pressure TPc' or TPc'' or the reference target oil pressure TPc selected in accordance with the turbine speed NT and the driving pulse signal Ca produced to have its pulse duty corresponding to the modified target oil pressure TPb' or TPb'' or the reference target oil pressure TPb selected in accordance with the turbine speed NT, are supplied to the solenoid valves 62 and 61, respectively, so that the solenoid valve 62 is controlled in accordance with the modified target oil pressure TPc' or TPc'' or the reference target oil pressure TPc to apply the operating oil pressure controlled to vary in accordance with the modified target oil pressure TPc' or TPc'' or the reference target oil pressure TPc to the 3-4 clutch 38 and the solenoid valve 61 is controlled in accordance with the modified target oil pressure TPb' or TPb'' or the reference target oil pressure TPb to apply the operating oil pressure controlled to vary in accordance with the modified target oil pressure TPb' or TPb'' or the reference target oil pressure TPb to the 2-4 brake device 36, in process 209, and then the step returns to the process 201.

The flow chart of FIG. 8 shows a program for a target pressure setting control. In the control according to the flow chart of FIG. 8, first, the detection output signals St and Sv are stored in process 210. Next, in decision 213, it is checked whether the 2-3 shifting-up flag R is 1 or not. If the 2-3 shifting-up flag R is not 1, the step returns to the process 210, and if the 2-3 shifting-up flag R is 1, it is checked whether the pressure setting flag F is 1 or not, in decision 214. If the pressure setting flag F is 1, the step returns to the process 210, and if the pressure setting flag F is not 1, the step advances to process 215.

In the process 215, a difference $\Delta N$ between a value Nn-1 of the turbine speed NT represented by the detection output signal St stored at the last time and a value Nn of the turbine speed NT represented by the detection output signal St newly stored in the process 210. Then, in decision 217, it is checked whether the difference $\Delta N$ obtained in the process 215 is less than $\alpha$ which is larger slightly than zero or not. If the difference $\Delta N$ is equal to or more than $\alpha$, the step returns to the process 210, and if the difference $\Delta N$ is less than $\alpha$, the step advances to decision 218.

In the decision 218, it is checked whether the value Nn of the turbine speed NT is equal to or larger than Nx which is larger slightly than a value determined by the vehicle traveling speed V and a change gear ratio K at the 3rd speed or not. If it is clarified in the decision 218 that the value Nn of the turbine speed NT is equal to or larger than Nx, the modified target oil pressures TPc' and TPb' as shown in FIG. 5 are set in process 219. Then, the pressure setting flag F is set to be 1 in process 220 and the step returns to the process 210.

Figure 6:
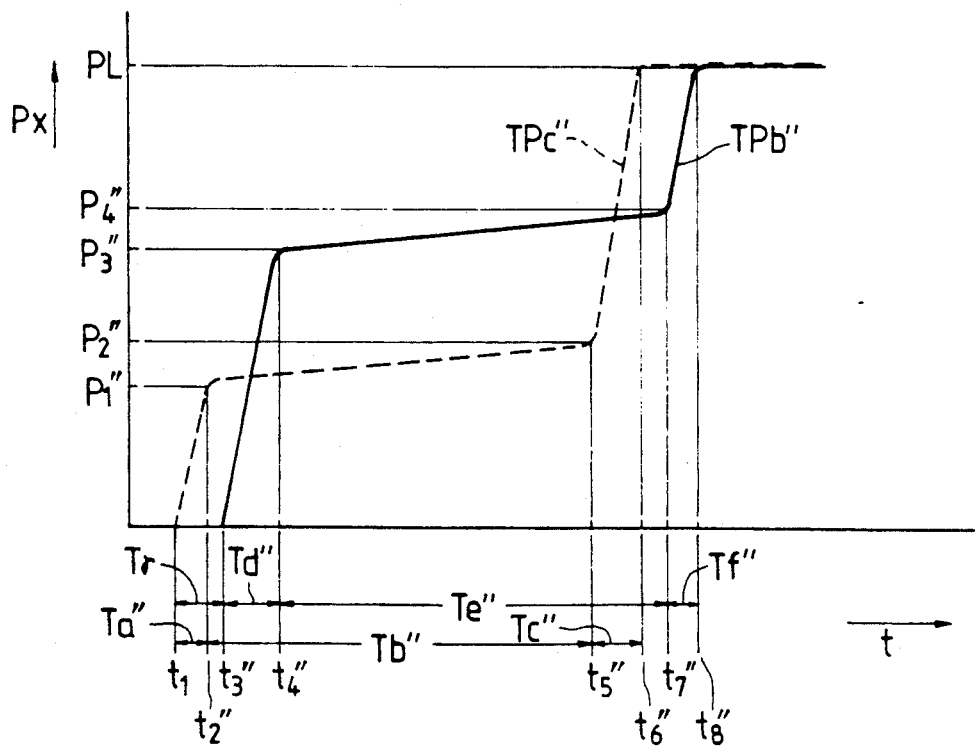

If it is clarified in the decision 218 that the value Nn of the turbine speed NT is smaller than Nx, it is checked whether the value Nn of the turbine speed NT is equal to or smaller than Ny which is smaller slightly than the value determined by the vehicle traveling speed V and the change gear ratio K at the 3rd speed or not, in decision 222. If it is clarified in the decision 222 that the value Nn of the turbine speed NT is equal to or smaller than Ny, the modified target oil pressures TPc'' and TPb'' as shown in FIG. 6 are set in process 223. Then, the pressure setting flag F is set to be 1 in process 220 and the step returns to the process 210. To the contrary, if it is clarified in the decision 222 that the value Nn of the turbine speed NT is larger than Ny, the reference target oil pressures TPc and TPb as shown in FIG. 3 are set in process 224. Then, the pressure setting flag F is set to be 1 in process 220 and the step returns to the process 210.

Although, in the above embodiment, the control for varying the operating oil pressure applied to two engaging friction elements, that is, the 3-4 clutch 38 and the 2-4 brake device 36 is carried out in one of three different manners in response to the minimum value of the turbine speed, the control for varying the operating oil pressure applied to two engaging friction elements can be so arranged as to be carried out in one of more than three different manners or a continuously varying manner, and a ratio of change of the turbine speed or one of other factors relating to the turbine speed can be utilized in place of the minimum value of the turbine speed. Further, although the embodiment is explained with reference to the 2-3 shifting-up operation, it is to be understood that the invention is not limited thereto and can be applied to various speed change operations other than the 2-3 shifting-up operation, each of which is carried out by causing each of two engaging friction elements to be in engagement or disengagement selectively.

Figure 9:
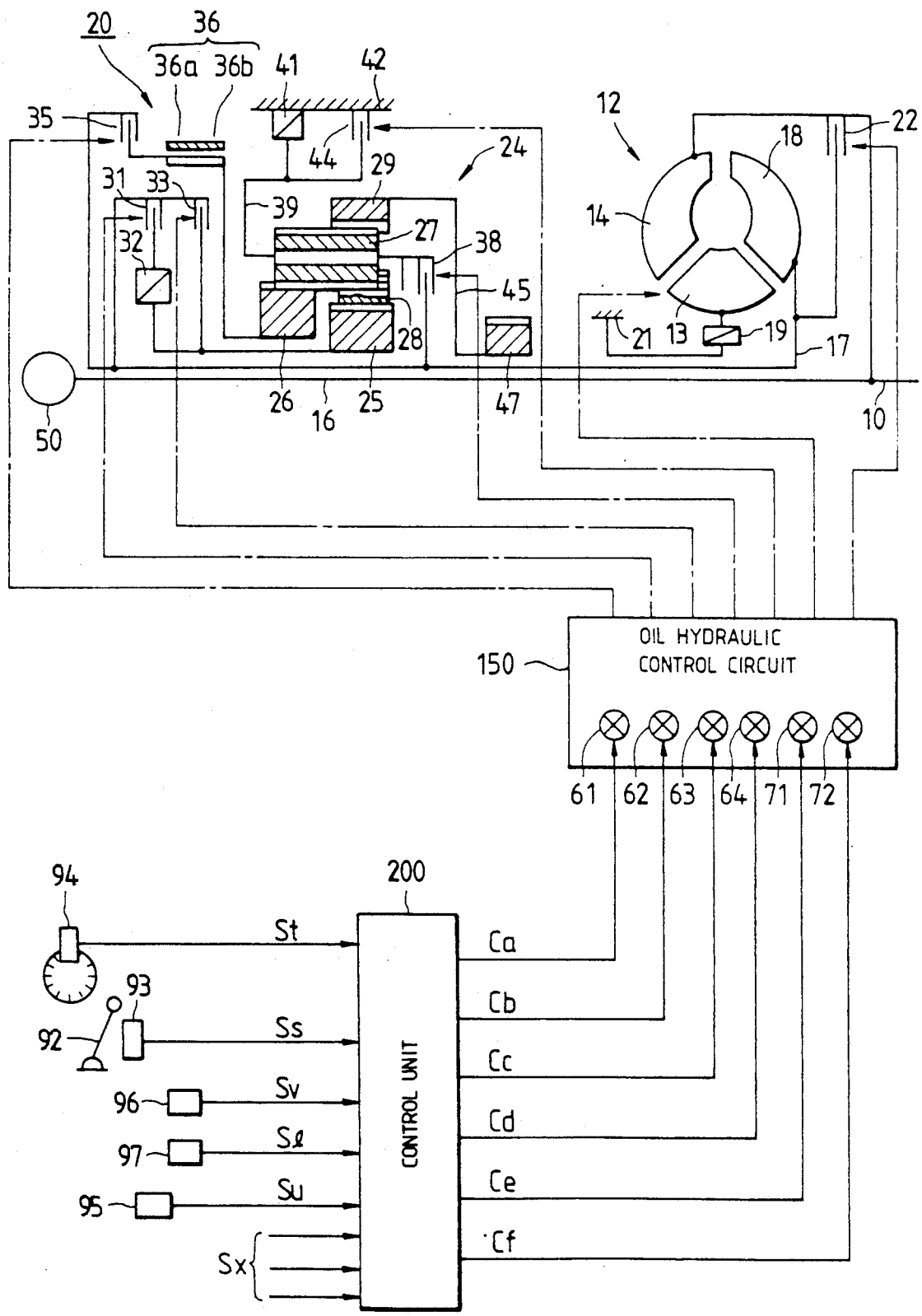
FIG. 9 is a schematic illustration showing another embodiment of control system for an automatic transmission according to the present invention.

FIG. 9 shows another embodiment of control system for an automatic transmission according to the present invention. In FIG. 9, elements, parts and signals corresponding to those of FIG. 1 are marked with the same reference and further description thereof will be omitted.

In the embodiment shown in FIG. 9, an automatic transmission comprising a torque converter 12, a power transmitting gear arrangement 20 and an oil pump 50 for producing operating oil pressure, and an oil hydraulic control circuit 150 which has the detailed configuration as shown in FIG. 2 operate in the same manner as those in the embodiment shown in FIG. 1.

A control unit 200 provided for controlling solenoid valves 61 to 64, 71 and 72 in the oil hydraulic control circuit 150 is supplied with a detection output signal Su obtained from an oil temperature sensor 95 for detecting the temperature of an operating oil discharged from the oil pump 50, in addition to detection output signals St, Ss, Sv, $S_l$, and Sx.

Upon a speed change control carried out under a condition in which a shift lever 92 is at the 1st range, 2nd range or D range position, the control unit 200 performs, for example, a speed change to the 2nd speed from the 3rd speed, that is, 3-2 shifting-down operation when the shift lever 92 is at the D range or the 2nd range position in the manner as described below.

During the 3rd speed, the control unit 200 supplies the solenoid valve 71 with a control signal Ce to keep the solenoid valves 71 in its ON state and simultaneously ceases to supply the solenoid valves 72 with a control signal Cf to cause the solenoid valves 72 to be in its OFF state. Further, the control unit 200 supplies also the solenoid valves 61 and 62 with driving pulse signals Ca and Cb each of which has its pulse duty increased to the maximum so as to cause each of the solenoid valves 61 and 62 not to have an opening period, so that a pilot pressure applied to each of a servocontrol valve 60 and a 3-4 control valve 67 in the oil hydraulic control circuit 150 is caused to have a maximum value. Therefore, in the oil hydraulic control circuit 150 as shown in FIG. 2, the operating oil pressure is applied to a 3-4 clutch 38 through a pressure line 103, a 2-3 shift valve 57, a pressure line 121, a 3-4 control valve 67 and a pressure line 122, to a releasing chamber 36A of a 2-4 brake device 36 through pressure lines 101 and 119, the servocontrol valve 60 and a pressure line 120, and to an applying chamber 36B of the 2-4 brake device 36 through the pressure line 101, a 1-2 shift valve 55 and a pressure line 118, so that the 3-4 clutch 38 is held in engagement and the 2-4 brake device 36 is held in disengagement.

Then, when the traveling speed represented by the detection output signal Sv or the engine load represented by the detection output signal S indicates that the 3-2 shifting-down operation should be carried out, the control unit 200 supplies the solenoid valve 72 with the control signal Cf to cause of the solenoid valve 72 to be in its ON state, and simultaneously reduces the pulse duty of each of the driving control signals Cb and Ca to reduce the operating oil pressure applied to each of the 3-4 clutch 38 and the releasing chamber 36A of the 2-4 brake device 36, so that the 3-4 clutch 38 is changed to be in disengagement and the 2-4 brake device 36 is changed to be in engagement.

For the 3-2 shifting-down operation thus performed, the control unit 200 is operative to vary the operating oil pressure applied to each of the the 3-4 clutch 38 and the releasing chamber 36A of the the 2-4 brake device 36 in different manners under a condition in which the temperature of the operating oil is relatively high and under a condition in which the temperature of the operating oil is relatively low, respectively, because the operating oil is increased in viscosity so as to cause the operating oil pressure to delay reaching each of the 3-4 clutch 38 and the releasing chamber 36A of the 2-4 brake device 36 and consequently it is feared that the 2-4 brake device 36 is caused to be in engagement at an unsuitable time after the 3-4 clutch 38 is completed to be in disengagement when the temperature of the operating oil is relatively low.

Figure 10:
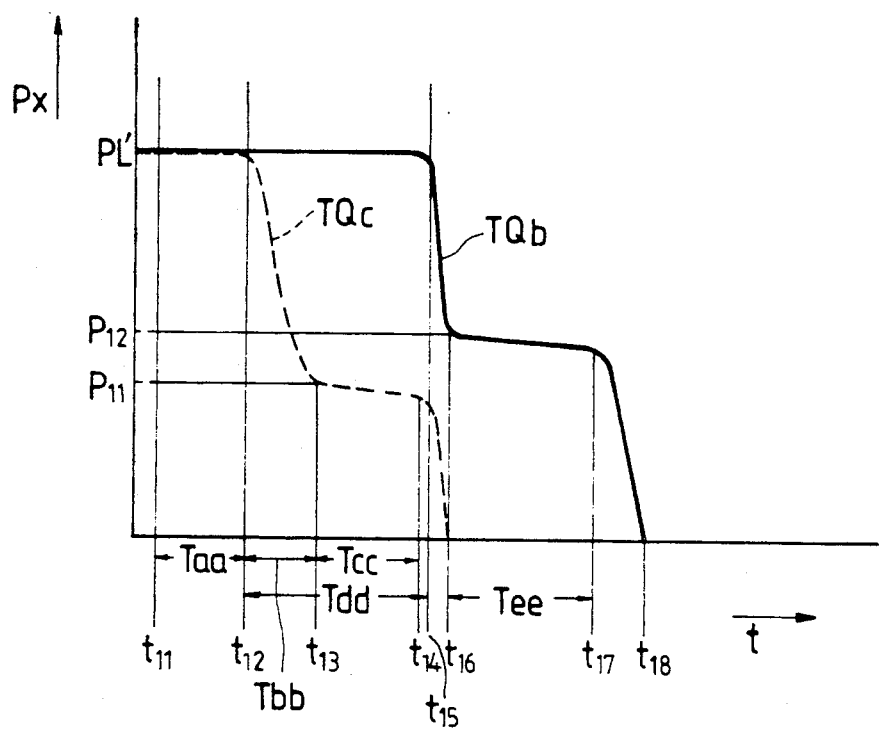
FIGS. 10 and 11 are time charts used for explaining the operation of the embodiment shown in FIG. 9.

In such control for the 3-2 shifting-down operation conducted by the control unit 200, when the temperature of the operating oil is equal to or higher than a predetermined value T1, a target oil pressure TQc for the 3-4 clutch 38 and a target oil pressure TQb for the releasing chamber 36A of the 2-4 brake device 36 are set as shown with broken and solid lines respectively in FIG. 10 in which an ordinate represents oil pressure Px and an abscissa represents time t. The target oil pressure TQc is determined to be PL' which is a maximum value during a period of time Taa between an instant $t_{11}$ at which the 3-2 shifting-down operation is commenced and an instant $t_{12}$ later than the instant $t_{11}$, to decrease rapidly to P11 during a period of time Tbb between the instant $t_{12}$ and an instant $t_{13}$ later the instant $t_{12}$, to decrease gently to a value smaller slightly than P11 during a period of time Tcc between the instant $t_{13}$ and an instant $t_{14}$ later the instant $t_{13}$, and to decrease further rapidly to be zero during a period of time between the instant $t_{14}$ and an instant $t_{16}$ later than the instant $t_{14}$. The target oil pressure TQb is determined to be PL' which is a maximum value during the period of time Taa and a period of time Tdd between the instant $t_{12}$ and an instant $t_{15}$ later than the instant $t_{12}$, to decrease rapidly to P12 larger than P11 during a period of time between the instant $t_{15}$ and the instant $t_{16}$, to decrease gently to a value smaller slightly than P12 during a period of time Tee between the instant $t_{16}$ and an instant $t_{17}$ later the instant $t_{16}$, and to decrease further rapidly to be zero during a period of time between the instant $t_{17}$ and an instant $t_{18}$ later than the instant $t_{17}$.

Figure 11:
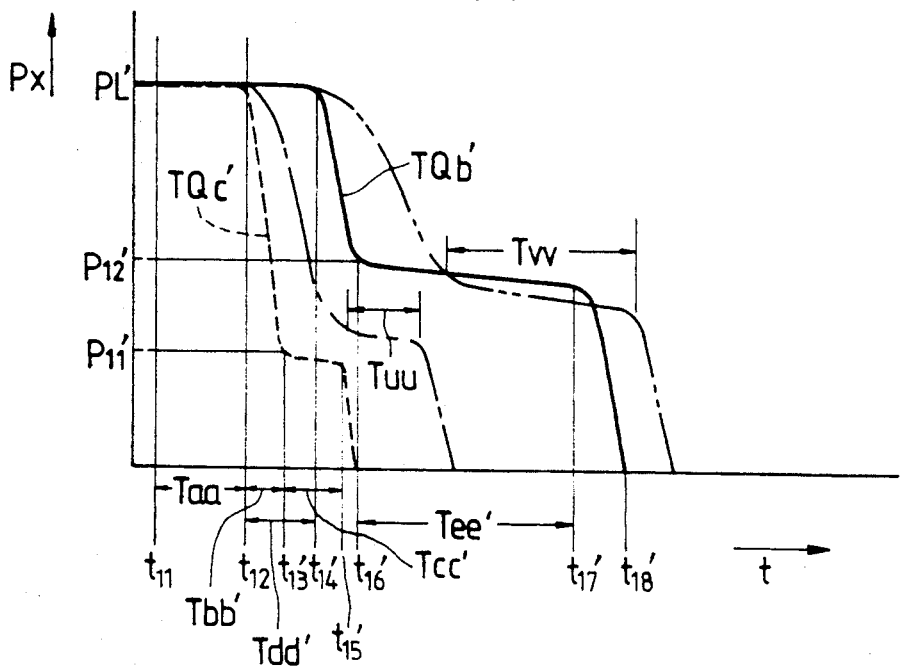

On the other hand, when the temperature of the operating oil is lower than the predetermined value T1, a target oil pressure TQc' for the 3-4 clutch 38 and a target oil pressure TQb' for the releasing chamber 36A of the 2-4 brake device 36 are set as shown with broken and solid lines respectively in FIG. 11. The target oil pressure TQc' is determined to be PL' which is a maximum value during the period of time Taa, to decrease rapidly to P11', which is smaller than P11, during a period of time Tbb', which is shorter than Tbb, between the instant $t_{12}$ and an instant $t_{13}'$ later the instant $t_{12}$, to decrease gently to a value smaller slightly than P11' during a period of time Tcc', which is shorter than Tcc, between the instant $t_{13}'$ and an instant $t_{15}'$ later the instant $t_{13}'$, and to decrease further rapidly to be zero during a period of time between the instant $t_{15}'$ and an instant $t_{16}'$ later than the instant $t_{15}'$. The target oil pressure TQb' is determined to be PL' which is a maximum value during the period of time Taa and a period of time Tdd', which is shorter than Tdd, between the instant $t_{12}$ and an instant $t_{14}'$ later than the instant $t_{12}$, to decrease rapidly to P12', which is larger slightly than P12, during a period of time between the instant $t_{14}'$ and the instant $t_{16}'$, to decrease gently to a value smaller slightly than P12' during a period of time Tee', which is longer than Tee, between the instant $t_{16}'$ and an instant $t_{17}'$ later the instant $t_{16}'$, and to decrease further rapidly to be zero during a period of time between the instant $t_{17}'$ and an instant $t_{18}'$ later than the instant $t_{17}'$.

Under a condition in which the temperature of the operating oil is equal to or higher than the predetermined value T1, the control unit 200 produces the driving pulse signal Cb having its pulse duty which varies to correspond to the target oil pressure TQc set as shown in FIG. 10 and the driving pulse signal Ca having its pulse duty which varies to correspond to the reference target oil pressure TQb set as shown in FIG. 10, and these driving pulse signals Cb and Ca are supplied to the solenoid valve 62 and 61, respectively. As a result, since the operating oil is reduced in viscosity and moved smoothly at the temperature thereof equal to or higher than the predetermined value T1, the operating oil pressure applied to the 3-4 clutch 38 and the operating oil pressure applied to the releasing chamber 36A of the 2-4 brake device 36 are varied to follow respectively the variation in the target oil pressure TQb and the variation in the target oil pressure TQc after the instant $t_{11}$.

With the operating oil pressure thus varied, the 3-4 clutch 38 is controlled to enter into slipping rapidly from an engaging state before the control during the period of time Tbb, to come into disengagement gradually during the period of time Tcc, and then to complete the disengagement rapidly to be in a disengaging state after the control during the period of time between the instant $t_{14}$ and the instant $t_{16}$, and the 2-4 brake device 36 is controlled to enter into slipping rapidly from a disengaging state before the control during the period of time between the instant $t_{15}$ and the instant $t_{16}$, to come into engagement gradually during the period of time Tee after the 3-4 clutch 38 has been kept in disengagement, and then to complete the engagement rapidly to be in an engaging state after the control during the short period of time between the instant $t_{17}$ and the instant $t_{18}$.

Under a condition in which the temperature of the operating oil is lower than the predetermined value T1, the control unit 200 produces the driving pulse signal Cb having its pulse duty which varies to correspond to the target oil pressure TQc' set as shown in FIG. 11 and the driving pulse signal Ca having its pulse duty which varies to correspond to the target oil pressure TQb' set as shown in FIG. 11, and these driving pulse signals Cb and Ca are supplied to the solenoid valve 62 and 61, respectively. As a result, since the operating oil is increased in viscosity so as to cause the operating oil pressure to delay reaching each of the 3-4 clutch 38 and the releasing chamber 36A of the 2-4 brake device 36 at the temperature thereof lower than the predetermined value T1, the operating oil pressure applied to the 3-4 clutch 38 varies with delay compared with the target oil pressure TQc' as shown with a dot-dash line in FIG. 11 and the operating oil pressure applied to the releasing chamber 36A of the 2-4 brake device 36 varies with delay compared with the target oil pressure TQb' as shown with a double dot-dash line in FIG. 11.

With the operating oil pressure thus varied, the 3-4 clutch 38 is controlled to enter into slipping rapidly from an engaging state before the control during a period of time longer than the period of time Tbb', to come into disengagement gradually during a period of time Tuu in which the operating oil pressure applied to the 3-4 clutch 38 has a relatively small reduction, and then to complete the disengagement rapidly to be in a disengaging state after the control, and the 2-4 brake device 36 is controlled to enter into slipping rapidly from a disengaging state before the control during a period of time longer than the period of time between the instant $t_{14}'$ and the instant $t_{16}'$, to come into engagement gradually during a period of time Tvv in which the operating oil pressure applied to the releasing chamber 36A of the 2-4 brake device 36 has a relatively small reduction after the 3-4 clutch 38 has been kept in disengagement and then is kept in engagement, and then to complete the engagement rapidly to be in an engaging state after the control, in the same manner as those under the condition in which the temperature of the operating oil is equal to or higher than the predetermined value T1.

With the control for varying the operating oil pressure applied to each of the 3-4 clutch 38 and the releasing chamber 36A of the 2-4 brake device 36 in accordance with the temperature of the operating oil as described above, the 2-4 brake device 36 comes into engagement at an appropriate time after the 3-4 clutch 38 is completed to be held in disengagement and therefore undesirable sudden rise in speed of the engine and undesirable shocks of great degree on the body of the vehicle can be prevented effectively on the occasion of the 3-2 shifting-down operation.

The operations of the control unit 200 for controlling the operating oil pressure in response to the temperature of the operating oil as described above are performed in accordance with, for example, a flow chart shown in FIGS. 12.

In the control according to the flow chart of FIG. 12, first, the detection output signals Sv, Ss, $S_l$, Su and Sx are stored in process 231. Next, in decision 232, it is checked whether the 3-2 shifting-down operation is to be carried out or not based on a shifting pattern previously stored in a memory contained in the control unit 200, the vehicle traveling speed V represented by the detection output signal Sv, the engine load represented by the detection output signal $S_l$, and the position of the shift lever 92 represented by the detection output signal Ss. If the 3-2 shifting-down operation is not to be carried out, various valves other than the solenoid valves 61 and 62 are controlled in process 235, and then the step returns to the process 231. To the contrary, if the 3-2 shifting-down operation is to be carried out, it is checked whether the temperature TE of the operating oil represented by the detection output signal Su is equal to or higher than the predetermined value T1 or not, in decision 236.

If it is clarified in the decision 236 that the temperature TE of the operating oil is equal to or higher than the predetermined value T1, the target oil pressures TQc and TQb as shown in FIG. 10 are set in process 237. Then, in process 238, the driving pulse signal Cb produced to have its pulse duty corresponding to the target oil pressure TQc set in the process 237 and the driving pulse signal Ca produced to have its pulse duty corresponding to the target oil pressure TQb set in the process 237 are supplied to the solenoid valves 62 and 61, respectively, so that the solenoid valve 62 is controlled in accordance with the target oil pressure TQc to apply the operating oil pressure controlled to vary in accordance with the target oil pressure TQc to the 3-4 clutch 38 and the solenoid valve 61 is controlled in accordance with the target oil pressure TQb to apply the operating oil pressure controlled to vary in accordance with the target oil pressure TQb to the 2-4 brake device 36, in process 238. After that, the solenoid valve 71 is controlled in process 240 and the step returns to the process 231.

On the other hand, if it is clarified in the decision 236 that the temperature TE of the operating oil is lower than the predetermined value T1, the target oil pressures TQc' and TQb' as shown in FIG. 11 are set in process 239. Then, in process 238, the driving pulse signal Cb produced to have its pulse duty corresponding to the target oil pressure TQc' set in the process 239 and the driving pulse signal Ca produced to have its pulse duty corresponding to the target oil pressure TQb' set in the process 239 are supplied to the solenoid valves 62 and 61, respectively, so that the solenoid valve 62 is controlled in accordance with the target oil pressure TQc' to apply the operating oil pressure controlled to vary in accordance with the target oil pressure TQc' to the 3-4 clutch 38 and the solenoid valve 61 is controlled in accordance with the target oil pressure TQb' to apply the operating oil pressure controlled to vary in accordance with the target oil pressure TQb' to the 2-4 brake device 36, in process 238. After that, the solenoid valve 71 is controlled in process 240 and the step returns to the process 231.

Although, in the above embodiment of FIG. 9, the control for varying the operating oil pressure applied to two engaging friction elements, that is, the 3-4 clutch 38 and the 2-4 brake device, is carried out in one of two different manners in response to the temperature of the operating oil, the control for varying the operating oil pressure applied to two engaging friction elements can be so arranged as to be carried out in one of more than two different manners or a continuously varying manner. Further, although the embodiment is explained with reference to the 3-2 shifting-down operation, it is to be understood that the invention is not limited thereto and can be applied to various speed change operations other than the 3-2 shifting-down operation, each of which is carried out by causing each of two engaging friction elements to be in engagement or disengagement selectively.

What is claimed is:

1. A control system for an automatic transmission employed in a vehicle comprising:

first and second engaging friction elements provided in the automatic transmission for giving rise to a speed change, operating oil pressure control means for applying operating oil pressure to each of said first and second engaging friction elements in accordance with a predetermined control characteristic so as to cause said first and second engaging friction elements to give rise to the speed change, judging means for judging a termination of the speed change at dNT/dt~O, where Nt is a turbine speed, information detecting means for obtaining information as to whether the turbine speed of the automatic transmission is within a predetermined permissible condition or not when the judging means judges the termination of the speed change, and timing control means for causing said operating oil pressure control means to be operative to adjust a time interval from a time at which said first engaging friction element is changed in its engaging condition to a later time at which said second engaging friction element is changed in its engaging condition in accordance with the information obtained from said information detecting means.

2. A control system according to claim 1, wherein said operating oil control means comprises first valve means for adjusting the operating oil pressure supplied from oil pressure producing means in accordance with a pilot pressure applied to the first valve and second valve means for producing said pilot pressure.

3. A control system according to claim 2, wherein said second valve means comprises a solenoid valve actuated by a driving pulse signal having its pulse duty controllable.

4. A control system according to claim 2, wherein said first valve means comprises a first pressure control valve disposed in a pressure line through which the operating oil pressure is applied to said first engaging friction element for causing said first engaging friction element to be in engagement and a second pressure control valve disposed in a pressure line through which the operating oil pressure is applied to said second engaging friction element for causing said second engaging friction element to be in disengagement.

5. A control system according to claim 1, wherein said predetermined control characteristic is so arranged that the operating oil pressure applied to said first engaging friction element is caused to vary rapidly to a first predetermined value during a first period of time in which said first engaging friction element is controlled to enter into slipping rapidly from a state before the control, to vary gently to a second predetermined value during a second period of time in which said first engaging friction element is controlled to advance change in its engaging condition gradually, and to vary rapidly to a third predetermined value during a third period of time in which said first engaging friction element is controlled to complete the change in its engaging condition rapidly to be in a state after the control, and further the operating oil pressure applied to said second engaging friction element is caused to vary rapidly to a fourth predetermined value during a fourth period of time in which said second engaging friction element is controlled to enter into slipping rapidly from a state before the control, to vary gently to a fifth predetermined value during a fifth period of time in which said second engaging friction element is controlled to advance change in its engaging condition gradually, and to vary rapidly to a sixth predetermined value during a sixth period of time in which said second engaging friction element is controlled to complete the change in its engaging condition rapidly to be in a state after the control.

6. A control system according to claim 1, wherein said information detecting means comprises means for producing said information based on the turbine speed in a torque converter included in the automatic transmission.

7. A control system according to claim 6, wherein said information detecting means is operative to obtain a difference between a reference turbine speed and the turbine speed actually detected at the termination of the speed change and to produce said information based on said difference obtained thereby.

8. A control system according to claim 6, wherein said first engaging friction element is held in disengagement at each of at least one lower speed and in engagement at each of at least one higher speed, said second engaging friction element is held in engagement at each of said at least one lower speed and in disengagement at each of said at least one higher speed, and said timing control means is operative to adjust a time at which said second engaging friction element enters into disengagement on the occasion of a shifting-up operation to higher speed from lower speed.

9. A control system according to claim 8, wherein said predetermined control characteristic is so arranged that the operating oil pressure applied to said first engaging friction element is caused to vary rapidly to a first predetermined value during a first period of time in which said first engaging friction element is controlled to enter into slipping rapidly from a state before the control, to vary gently to a second predetermined value during a second period of time in which said first engaging friction element is controlled to advance change in its engaging condition gradually, and to vary rapidly to a third predetermined value during a third period of time in which said first engaging friction element is controlled to complete the change in its engaging condition rapidly to be in a state after the control, and further the operating oil pressure applied to said second engaging friction element is caused to vary rapidly to a fourth predetermined value during a fourth period of time in which said second engaging friction element is controlled to enter into slipping rapidly from a state before the control, to vary gently to a fifth predetermined value during a fifth period of time in which said second engaging friction element is controlled to advance change in its engaging condition gradually, and to vary rapidly to a sixth predetermined value during a sixth period of time in which said second engaging friction element is controlled to complete the change in its engaging condition rapidly to be in a state after the control, and said timing control means is operative to vary the operating oil pressure at the end of at least one of said first and fourth periods of time.

10. A control system according to claim 1, wherein said timing control means changes the control characteristic of said operating oil pressure control means so that said first and second engaging friction elements can adjust the time interval.

11. A control system according to claim 10, said control characteristic is chosen from a predetermined plurality of characteristics.

12. A control system according to claim 11, wherein said timing control means changes both the characteristics of said first and second engaging friction element.

13. A control system for an automatic transmission employed in a vehicle comprising:
first and second engaging friction elements provided in the automatic transmission for giving rise to speed change,
operating oil pressure control means for applying operating oil pressure to each of said first and second engaging friction elements in accordance with a predetermined control characteristic so as t cause said first and second engaging friction elements to give rise to the speed change,
information detecting means for obtaining information of the operating condition of the automatic transmission comprising means for producing said information based on a turbine speed in a torque converter included in the automatic transmission, and
timing control means for causing said operating oil pressure control means to be operative to adjust a time interval from a time at which said first engaging friction elements is changed in its engaging condition to a later time at which said second engaging friction element is changed in its engaging condition in accordance with the information obtained from said information detecting means;
wherein said first engaging friction element is held in disengagement at each of at least one slower speed and in engagement at each of at least one higher speed, said second engaging friction element is held in engagement at each of said at least one lower speed and in disengagement at each of said at least one higher speed, and said timing control means is operative to adjust a time at which said second engaging friction element enters into disengagement on the occasion of a shifting-up operation to a higher speed from a lower speed, and said predetermined control characteristic is so arranged that the operating oil pressure applied to said first engaging friction element is caused to vary rapidly to a first predetermined value during a first period of time in which said first engaging friction element is controlled to enter into slipping rapidly from a state before the control, to vary gently to a second predetermined value during a second period of time in which said first engaging friction element is controlled to advance change in its engaging condition gradually, and to vary rapidly to a third predetermined value during a third period of time in which said first engaging friction element is controlled to complete the change in its engaging condition rapidly to be in a state after the control, and further the operating oil pressure applied to said second engaging friction element is caused to vary rapidly to a fourth predetermined value during a fourth period of time in which said second engaging friction element is controlled to enter into slipping rapidly from a state before the control, to vary gently to a fifth predetermined value during a fifth period of time in which said second engaging friction element is controlled to advance change in its engaging condition gradually, and to vary rapidly to a sixth predetermined value during a sixth period of time in which said second engaging friction element is controlled to complete the change in its engaging condition rapidly to be in a state after the control, and said timing control means is operative to vary the operating oil pressure at the end of at least one of said first and fourth periods of time with the information detecting means being operative to obtain a difference between a reference turbine speed and the turbine speed actually detected at the termination of the speed change and to produce said information based on said difference obtained thereby, and said timing control means is operative to increase the operating oil pressure applied to said first engaging friction element at the end of said first period of time and to decrease the operating oil pressure applied to said second engaging friction element at the end of said fourth period of time when said difference obtained by said information detecting means indicates that said turbine speed actually detected is higher than said target turbine speed, and further operative to decrease the operating oil pressure applied to said first engaging friction element at the end of said first period of time and to increase the operating oil pressure applied to said second engaging friction element at the end of said fourth period of time when said difference obtained by said information detecting means indicates that said turbine speed actually detected is lower than said target turbine speed.

14. A control system for an automatic transmission employed in a vehicle comprising:

first and second engaging friction elements provided in the automatic transmission for giving rise to speed change, operating oil pressure control means for applying operating oil pressure to each of said first and second engaging friction elements in accordance with a predetermined control characteristic so as to cause said first and second engaging friction elements to give rise to the speed change, information detecting means for obtaining information of the operating condition of the automatic transmission said information detecting means comprising means for detecting temperature of an operating oil contained in said operating oil pressure control means so as to produce the operating oil pressure and producing said information based on the temperature detected thereby, and timing control means for causing said operating oil pressure control means to be operative to adjust a time interval from a time at which said first engaging friction element is changed in its engaging condition to a later time at which said second engaging friction element is changed in its engaging condition in accordance with the information obtained from said information detecting means;

wherein said first engaging friction element is held in disengagement at each of at least one lower speed and in engagement at each of at least one higher speed, said second engaging friction element is held in engagement at each of said at least one lower speed and in disengagement at each of said at least one higher speed, and said timing control means is operative to adjust a time at which said second engaging friction element enters into engagement on the occasion of a shifting-down operation to a lower speed from a higher speed, and said predetermined control characteristic is so arranged that the operating oil pressure applied to said first engaging friction element is caused to vary rapidly to a first predetermined value during a first period of time in which said first engaging friction element is controlled to enter into slipping rapidly from a state before the control, to vary gently to a second predetermined value during a second period of time in which said first engaging friction element is controlled to advance change in its engaging condition gradually, and to vary rapidly to a third predetermined value during a third period of time in which said first engaging friction element is controlled to complete the change in its engaging condition rapidly to be in a state after the control, and further the operating oil pressure applied to said second engaging friction element is caused to vary rapidly to a fourth predetermined value during a fourth period of time in which said second engaging friction element is controlled to enter into slipping rapidly from a state before the control, to vary gently to a fifth predetermined value during a fifth period of time in which said second engaging friction element is controlled to advance change in its engaging condition gradually, and to vary rapidly to a sixth predetermined value during a sixth period of time in which said second engaging fourth element is controlled to complete the change in it engaging condition rapidly to be in a state after the control, and said timing control means is operative to vary the operating oil pressure at the end of at least said first and fourth periods of time with said timing control means is operative to shorten said first period of time, to decrease the operating oil pressure applied to said first engaging friction element at the end of said first period of time, to shorten a period of time between the beginning of said first period of time and the beginning of said fourth period of time, and to increase the operating oil pressure applied to said second engaging friction element at the end of said fourth period of time when the information obtained from said information detecting means indicates that the temperature detected by said information detecting means becomes lower than a predetermined value.

* * * * *